United States Patent
Wu

(10) Patent No.: US 12,019,859 B2
(45) Date of Patent: Jun. 25, 2024

(54) SETTING CONTROL DISPLAY METHOD AND APPARATUS, STORAGE MEDIUM, AND ELECTRONIC APPARATUS

(71) Applicant: GUANGDONG OPPO MOBILE TELECOMMUNICATIONS CORP., LTD., Guangdong (CN)

(72) Inventor: Xuanying Wu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/950,754

(22) Filed: Sep. 22, 2022

(65) Prior Publication Data

US 2023/0014457 A1 Jan. 19, 2023

Related U.S. Application Data

(63) Continuation of application No. PCT/CN2021/074480, filed on Jan. 29, 2021.

(30) Foreign Application Priority Data

Mar. 23, 2020 (CN) .......................... 202010205701.4

(51) Int. Cl.
  *G06F 3/04847* (2022.01)
  *G06F 3/04817* (2022.01)
  *G06F 3/04842* (2022.01)
(52) U.S. Cl.
  CPC ...... *G06F 3/04847* (2013.01); *G06F 3/04817* (2013.01); *G06F 3/04842* (2013.01)

(58) Field of Classification Search
CPC .. G06F 3/048; G06F 3/04847; G06F 3/04817; G06F 3/04842
See application file for complete search history.

(56) References Cited

U.S. PATENT DOCUMENTS 7,587,679 B1 * 9/2009 Sundermeyer .......... G06F 9/451
  715/765
2001/0043198 A1 * 11/2001 Ludtke ................ G06F 3/04847
  345/173

(Continued)

FOREIGN PATENT DOCUMENTS

CN  1346457 A  4/2002
CN  101086695 A  12/2007

(Continued)

OTHER PUBLICATIONS

Chinese First Office Action with English Translation for CN Application 202010205701.4, dated Jan. 21, 2022. (21 pages).

(Continued)

*Primary Examiner* — Liang Y Li
(74) *Attorney, Agent, or Firm* — Young Basile Hanlon & MacFarlane, P.C.

(57) ABSTRACT

Described are a setting control display method and apparatus, a storage medium, and an electronic device. The method comprises: receiving a sliding instruction for a thumb in a slider, the sliding instruction instructing the thumb to continue sliding along a first direction after sliding to the first end of the slider, and the first direction being a direction indicated by the first end; and in response to the sliding instruction, displaying, at a preset position, an information setting control associated with a system function corresponding to the slider.

18 Claims, 8 Drawing Sheets

(56) References Cited

U.S. PATENT DOCUMENTS

| | | |
|---|---|---|
| 2011/0246943 A1 | 10/2011 | Fujibayashi |
| 2012/0280922 A1 | 11/2012 | Lee et al. |
| 2013/0014057 A1 | 1/2013 | Reinpoldt et al. |
| 2013/0167082 A1* | 6/2013 | Joo ................ G06F 3/0482 715/810 |
| 2013/0239057 A1* | 9/2013 | Ubillos ............ G06F 3/04842 715/833 |
| 2014/0043211 A1* | 2/2014 | Park ................ G02B 27/01 345/8 |
| 2015/0324112 A1* | 11/2015 | Xiong .............. G06F 3/0482 715/773 |
| 2018/0267637 A1 | 9/2018 | Wild et al. |
| 2018/0329461 A1 | 11/2018 | Hernandez Santisteban et al. |
| 2020/0050348 A1 | 2/2020 | Yabuki et al. |
| 2020/0064994 A1 | 2/2020 | Balakrishnan |

FOREIGN PATENT DOCUMENTS

| | | |
|---|---|---|
| CN | 101667090 A | 3/2010 |
| CN | 102012813 A | 4/2011 |
| CN | 202102410 U | 1/2012 |
| CN | 102929573 A | 2/2013 |
| CN | 104683597 A | 6/2015 |
| CN | 106095266 A | 11/2016 |
| CN | 106201280 A | 12/2016 |
| CN | 106980438 A | 7/2017 |
| CN | 107924264 A | 4/2018 |
| CN | 107992263 A | 5/2018 |
| CN | 109032468 A | 12/2018 |
| CN | 109213481 A | 1/2019 |
| CN | 105528073 B | 10/2019 |
| CN | 110837406 A | 2/2020 |
| CN | 111443956 A | 7/2020 |
| GB | 2495270 A | 4/2013 |
| WO | WO-03038566 A2 * | 5/2003 ......... G06F 19/3456 |

OTHER PUBLICATIONS

Chinese second Office Action with English Translation for CN Application 202010205701.4 dated Jul. 11, 2022. (21 pages).

International Search Report and Written Opinion with English Translation for PCT Application PCT/CN2021/074480 dated May 7, 2021. (13 pages).

European Search Report for European Patent Application No. 21774423.4, dated Aug. 31, 2023 (7 pages).

* cited by examiner

SETTING CONTROL DISPLAY METHOD AND APPARATUS, STORAGE MEDIUM, AND ELECTRONIC APPARATUS

CROSS-REFERENCE TO RELATED APPLICATION(S)

The present application is a continuation-application of International (PCT) Patent Application No. PCT/CN2021/074480, filed on Jan. 29, 2021, which claims priority of Chinese patent application No. 202010205701.4, filed on Mar. 23, 2020, the entire contents of both of which are hereby incorporated by reference.

TECHNICAL FIELD

The present disclosure relates to the field of computers, and in particular to a method of displaying a setting control, an apparatus, a non-transitory storage medium, and an electronic device.

BACKGROUND

A slide block in a slide bar of a mobile apparatus may be dragged to move within only a certain range to set a certain parameter, a continuous operation may be invalid when the slide block is dragged to reach a maximum boundary or a minimum boundary of the slide bar. Therefore, performing operations on the slide bar can only achieve one function, which limits application of the slide bar.

SUMMARY

In a first aspect, the embodiment of the present disclosure provides a method of displaying a setting control. The method includes following operations.

A sliding operation on a slide block in a slide bar on a user interface may be received. The sliding operation may be configured to control the slide block to continue sliding along a first direction after the slide block reaches a first end portion of the slide bar, and the first direction is a direction indicated by the first end portion.

In response to the sliding operation, an information setting control may be displayed at a first position, and a function of the information setting control is associated with a function of the slide bar.

In a second aspect, the embodiments of the present disclosure provide a computer-readable non-transitory storage medium. The non-transitory storage medium may store a plurality of instructions, and the instructions are configured to be loaded by a processor to perform the operations of the method of the above aspects.

In a third aspect, the embodiments of the present disclosure provide an electronic device, including a processor and a memory. The memory may store computer programs, and the processor is configured to load the computer programs to perform the operations of the method of the above aspects.

BRIEF DESCRIPTION OF DRAWINGS

In order to more clearly illustrate technical solutions of embodiments of the present disclosure or technical solutions in the related art, accompanying drawings for the embodiments or the related art will be briefly described in the following. Obviously, the drawings in the following show only some of the embodiments of the present disclosure. Any ordinary skilled person in the art may obtain other drawings based on these drawings without any creative work.

DETAILED DESCRIPTION

The technical solutions in the embodiments of the present disclosure will be clearly and completely described below in connection with the drawings in the embodiments of the present disclosure. Obviously, the described embodiments are only a part but not all of the embodiments of the present disclosure. All other embodiments obtained by those of ordinary skill in the art based on the embodiments in the present disclosure without making creative work shall fall within the scope of the present disclosure.

In the description of the present disclosure, it shall be the understood that, terms "first", "second", and the like are used herein for descriptive purposes only, and shall not be interpreted as indicating or implying relative importance. In the description of the present disclosure, to be noted that "including", "having" and any variation thereof are intended to cover non-exclusive inclusion unless otherwise expressly specified and defined. For example, a process, a method, a system, a product or an apparatus including a series of operations or units is not limited to the listed operations or units, but optionally also includes unlisted operations or units, or optionally also includes other operations or units inherent to the process, the method, the product or the apparatus. For those of ordinary skill in the art, specific meanings of the above terms in the present disclosure may be understood based on actual situations. Also, in the description of the present disclosure, "a plurality" means two or more unless otherwise specified. "And/or", which describes an association relationship of associated objects, means that there can be three kinds of relationships. For example, A and/or B may indicate that A exists alone, A and B exist at the same time, or B exists alone. The character "/" generally indicates that the associated objects are in an "or" relationship.

The present disclosure will be described in detail in the following by referring to specific embodiments.

Figure 1:
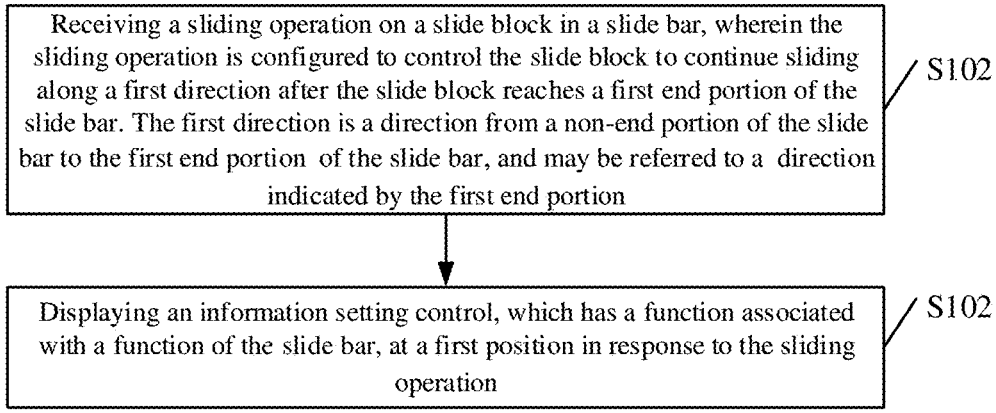
FIG. 1 is a flow chart of a method of displaying a setting control according to an embodiment of the present disclosure.

In an embodiment, as shown in FIG. 1, a method of displaying a setting control is provided. The method may be implemented by relying on a computer program and may be run on a setting control display apparatus based on the Von Neumann system. The computer program may be integrated into an application or run as an independent application. The setting control display apparatus may be an electronic device, including but not limited to: a wearable device, a handheld device, a personal computer, a tablet computer, a vehicle-mounted device, a smart phone, a computing device or any other processing device connected to a wireless modem.

In detail, the method of displaying the setting control may include following operations.

In an operation S101, a sliding operation on a slide block in a slide bar on a user interface may be received. The sliding operation may control the slide block to continue sliding along a first direction after the slide block reaches a first end portion of the slide bar. The first direction is a direction from a non-end portion of the slide bar to the first end portion of the slide bar, and may be referred to as a direction indicated by the first end portion.

The slide bar may include the slide block. Function of a system may be set by adjusting a position of the slide block in the slide bar. Different slide bars may be configured for different functions, such as a brightness slide bar for adjusting display brightness, a volume slide bar for adjusting a playing volume, and a color temperature slide bar for adjusting a color temperature.

In some embodiments, the first end portion may be an end portion corresponding to a maximum value in the slide bar or an end portion corresponding to a minimum value in the slide bar. The slide bar may usually be configured to have a certain sliding range. For example, when the slide block in the slide bar moves to reach a left end portion, the minimum value may be reached, and when the slide block moves to reach a right end portion, the maximum value may be reached. In this case, the first end portion may be the left end portion or the right end portion; similarly, in some embodiments, when the slide bar is vertical, the first end portion may be an upper end portion or a lower end portion.

The slide bar may be configured in system setting options or configured on a quick setting interface.

It should be noted that, the slide block continuing to slide in the direction indicated by the first end portion after the slide block reaching the first end portion of the slide bar may be understood as the following. The slide block may be currently located at the first end portion, and the slide block may be controlled to further slide along the direction from the non-end portion of the slide bar to the first end portion of the slide bar, and the direction may be referred to as the direction indicated by the first end portion, such that the slide block may reach an outside of the first end portion. Alternatively, it may be understood as the following. The slide block may be currently located at a portion of the slide bar rather than the end portion of the slide bar, the user needs to control the slide bar to slide to reach the first end portion along the direction from the non-end portion of the slide bar to the first end portion of the slide bar, and further control the slide bar to slide towards the outside of the first end portion along the direction from the non-end portion of the slide bar to the first end portion of the slide bar.

Figure 2:
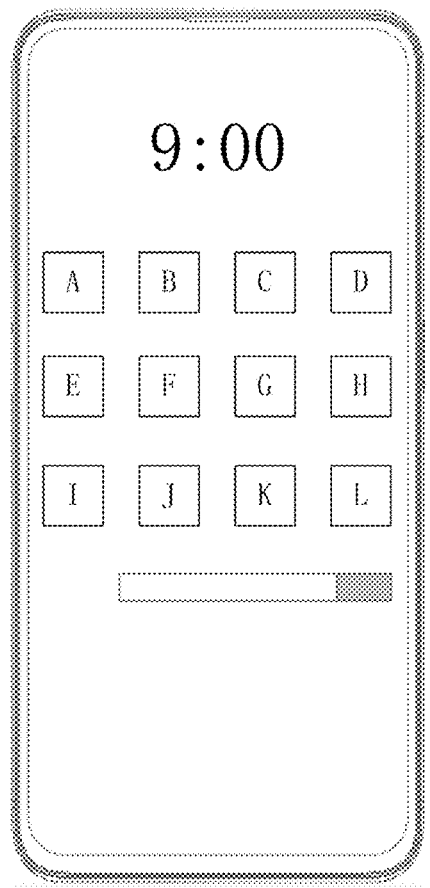
FIG. 2 is a schematic diagram showing a displaying effect of a quick setting interface according to an embodiment of the present disclosure.

For example, FIG. 2 shows a quick setting interface, which may include a brightness slide bar. In this case, the slide block is currently located at a middle portion (indicating a medium brightness) of the slide bar. The slide block may be controlled to slide along the first end portion of the slide bar, and after the slide block reaches the first end portion, the slide block is controlled to further slide along the direction from the non-end portion of the slide bar to the first end portion of the slide bar, and may be referred to as the direction indicated by the first end portion.

When the slide block is located at the first end portion of the slide bar, the user may click the slide block to continue sliding in the direction indicated by the first end portion, and at this moment, the terminal may receive the sliding operation that controls the slide block in the slide bar to further slide along the direction.

Figure 3:
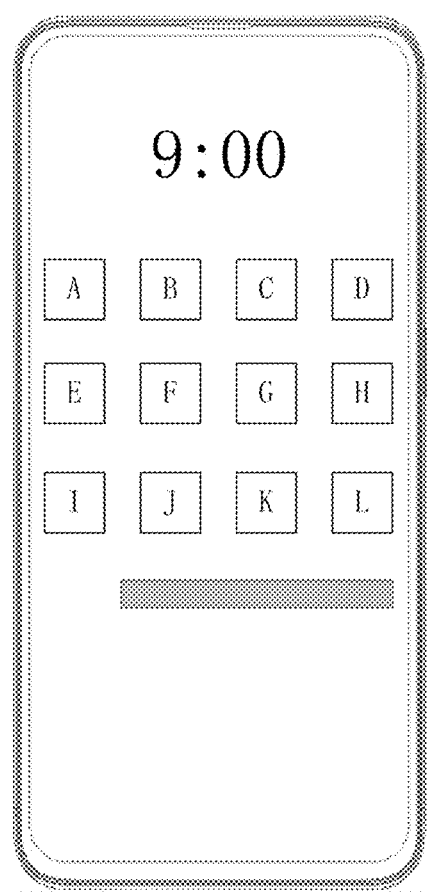
FIG. 3 is a schematic diagram showing a displaying effect of a slide block reaching a boundary of a slide bar according to an embodiment of the present disclosure.

For example, as shown in FIG. 3, the user may click the slide block in the slide bar to slide to the left, and after the slide block reaches the left end portion, the user controls the slide block to continue to slide to the left.

In an operation S102, in response to the sliding operation, an information setting control may be displayed at a first position, wherein a function of the information setting control is associated with a function of the slide bar.

It shall be understood that since the system may have various slide bars, and the various slide bars may correspond to various system functions. Therefore, the displayed information setting control may be a control associated with the system function corresponding to the current slide bar.

When the slide bar is a brightness adjustment slide bar, a control associated with a system function corresponding to the brightness adjustment slide bar may be a light-dark mode control, a transparent mode control, a color mode control, and the like.

When the slide bar is a volume adjustment slide bar, a control associated with a system function corresponding to the volume adjustment slide bar may be a vibration mode control, a default ringtone control, a do-not-disturb (DND) mode control, and the like.

A type of the information setting control may be preset. When the user controls the slide block to slide out of the first end portion, the preset information setting control may be displayed.

Figure 4:
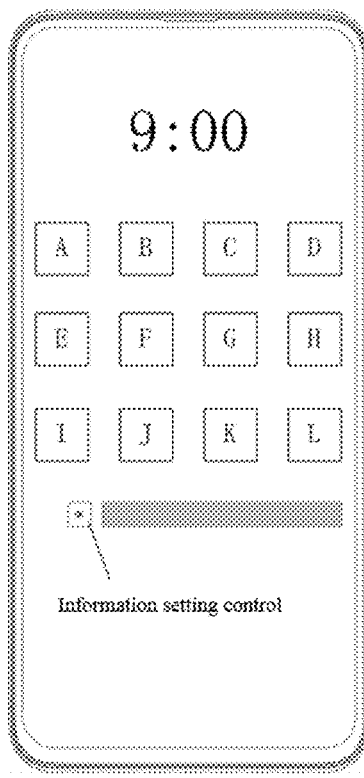
FIG. 4 is a schematic diagram showing a displaying effect of an information setting control according to an embodiment of the present disclosure.

Of course, a first position of the information setting control may also be preset, such as at a position adjacent to the end portion of the slide bar. In some embodiments, the first position may locate out of the slide bar and on an extension of the slide bar. In addition, the first position may be 50 mm away from the first end portion of the slide bar, as shown in FIG. 4.

In some embodiments, when all or most of slide bars included in the system include the above-described operation function, in order to enable the user to know specific functions of the displayed extended control, a corresponding icon or texts may be displayed on the information setting control to prompt the user.

In the embodiments of the present disclosure, the sliding operation on the slide block in the slide bar may be received, the sliding operation may control the slide block to continue to slide along the direction indicated by the first end portion after the slide block reaches the first end portion. The information setting control, which has the function associated with the system function of the slide bar, may be displayed at the first position. When the user controls the slide block to continue to slide along the end portion, the extended control may be displayed at the first position, such that the user may perform operations on the extended control to set functions. Therefore, functions of the slide bar may be expanded, and application scenarios of the slide bar may be increased.

Figure 5:
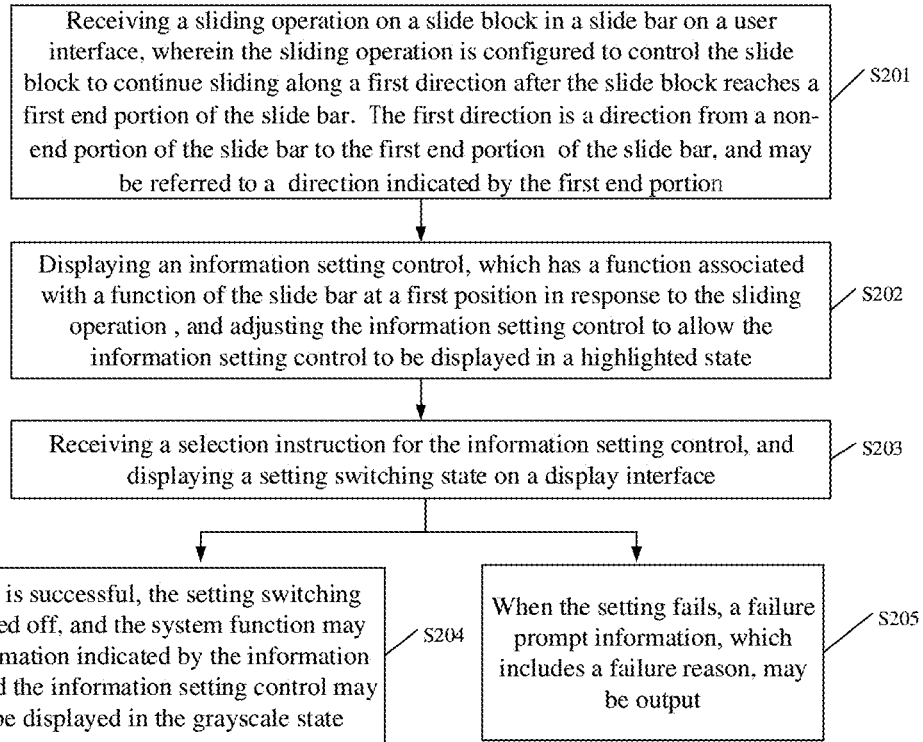
FIG. 5 is a flow chart of another method of displaying a setting control according to an embodiment of the present disclosure.

As shown in FIG. 5, FIG. 5 is a flow chart of another method of displaying a setting control according to an embodiment of the present disclosure. More details will be described in the following.

In an operation S201, the sliding operation on the slide block in the slide bar may be received. The sliding operation may control the slide block to continue to slide along the first direction after to the slide block reaches the first end portion of the slide bar. The first direction is the direction from the non-end portion of the slide bar to the first end portion of the slide bar, and may be referred to as the direction indicated by the first end portion.

Details of the operation S201 may refer to the operation of S101 and will not be repeatedly described herein.

In an operation S202, in response to the sliding operation, the information setting control, which has the function associated with the system function of the slide bar, may be displayed at the first position, and the information setting control may be adjusted to be displayed in a highlighted state.

The system may have various slide bars, and the various slide bars may correspond to various system functions. Therefore, the displayed information setting control may be the control associated with the system function corresponding to the current slide bar.

The information setting control being adjusted to be displayed in the highlighted state may be interpreted as the following. At this moment, the slide block in the slide bar may be moved from the slide bar to the information setting control, a focus of a display interface may be on the information setting control, and setting may be performed by touching the information setting control.

Further, the information setting control may be adjusted to be displayed in a grayscale state, and that is, the slide bar is in an unsettable state at this time.

In some embodiments, when the information setting control is touched to slide along a direction towards the slide bar (opposite to the direction from a non-end portion of the slide bar to the first end portion of the slide bar), the information setting control may be adjusted to be displayed in the grayscale state or to be hidden, and the slide block may be moved to be located in the slide bar and displayed in the highlighted state, such that the user may easily control the movement of the slide block.

In an operation S203, a selection instruction for the information setting control may be received, and a setting switching state may be displayed on the display interface.

The selection instruction may be an instruction generated by the user touching (such as clicking) the control, or generated by a voice or a gesture.

When the control is selected, the system is triggered, allowing setting operations to be performed, and the setting switching state may be displayed on the display interface, such that the user may know a setting progress. The setting switching state may be a progress of switching from a current state to setting information indicated by the information setting control.

Figure 6:
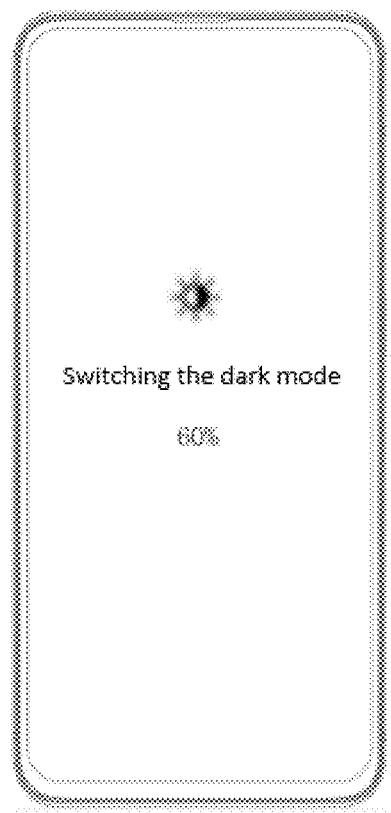
FIG. 6 is a schematic diagram showing a displaying effect of setting a switching state according to an embodiment of the present disclosure.

As shown in FIG. 6, the slide bar is the brightness adjustment slide bar, and the information setting control is a dark mode control. When the user clicks the dark mode control, a mode switching state "switching to the dark mode" may be displayed on the display interface. Of course, in order to improve the user experience, a switching progress bar or a switching completion percentage may be displayed.

In an operation S204, when the setting is successful, the setting switching state may be turned off, and the system function may be set as the information indicated by the information setting control, and the information setting control may be adjusted to be displayed in the gray scale state.

It may take the system a short period of time to perform the setting. Therefore, after the setting is performed successfully, i.e., when the progress bar becomes full or the switching completion percentage is 100%, the setting switching state may be turned off, an information switching process may be completed, and the information setting control may be adjusted synchronously to be displayed in the grayscale state to indicate that the focus of the interface is not on the control anymore.

In an operation S205, when the setting fails, a failure prompt information, which includes a failure reason, may be output.

Figure 7:
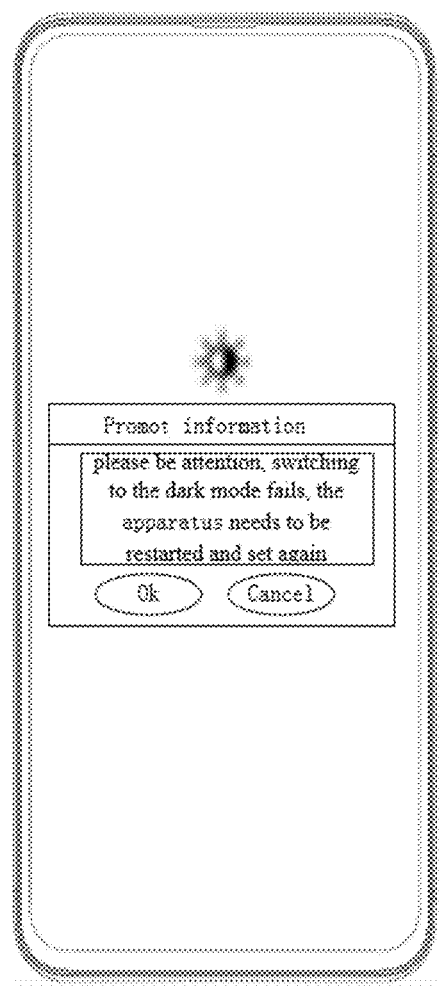
FIG. 7 is a schematic diagram showing a displaying effect of a prompt information of a switching failure according to an embodiment of the present disclosure.

When a bug is present in the system, or when a switching operation procedure (such as restarting the device) may be set to ensure security of information settings, information setting may fail. After confirming the setting fails, prompt information may pop-up on the display interface, as shown in FIG. 7. The prompt information may be "please be attention, switching to the dark mode fails, the device needs to be restarted and set again". The failure reason "needs to be restarted" may be included, such that users may acknowledge the failure reason conveniently and complete the setting according to the failure reason.

In the embodiments of the present disclosure, the sliding operation on the slide block in the slide bar may be received, the sliding operation may control the slide block to continue to slide along the direction indicated by the first end portion after the slide block reaches the first end portion of the slide bar. The information setting control, which has the function associated with the system function of the slide bar, may be displayed at the first position. The extended control may be displayed at the first position when the user controls the slide block to continue to slide along the end portion. In this way, functions of the slide bar may be expanded, and application scenarios of the slide bar may be increased. Furthermore, the user may perform operations on the extended control for setting functions. Usually, the slide bar may be configured on the quick setting interface. The user may set extended functions by simply performing operations on the slide bar on the quick setting interface, without entering setting options of the system to find out the function to be set. In this way, the setting process may be simplified, and time consumed for setting may be shortened. In addition, in the process that the user clicks the extended control for setting, the setting switching state may be displayed, and the prompt information may be displayed when the setting fails, the display effect may be intuitive and convenient, and the user experience may be improved. Moreover, the extended control may be set to be displayed in the highlighted mode and in the grayscale mode when the extended control is in different states, and the display effect may be intuitive and conform to the user's usage habits.

Figure 8:
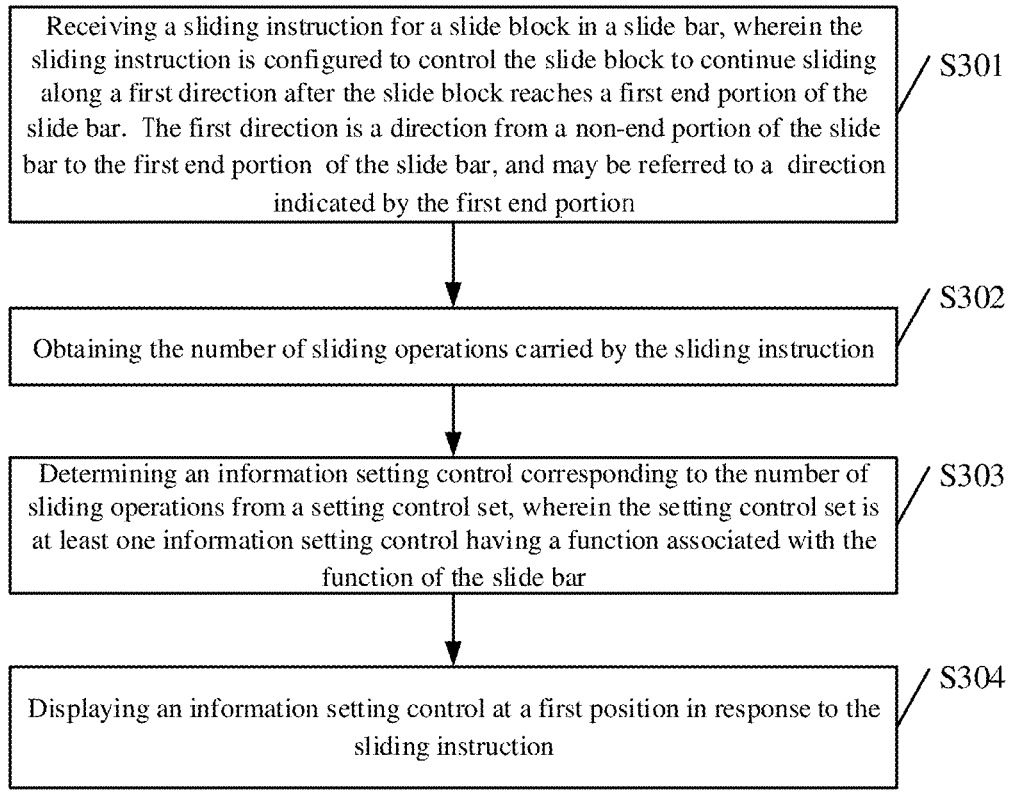
FIG. 8 is a flow chart of another method of displaying a setting control according to an embodiment of the present disclosure.

As shown in FIG. 8, FIG. 8 is a flow chart of another method of displaying a setting control according to an embodiment of the present disclosure. More details will be described in the following.

In an operation S301, the sliding operation on the slide block in the slide bar may be received. The sliding operation may control the slide block to continue to slide along the first direction after the slide block reaches the first end portion of the slide bar. The first direction is the direction from the non-end portion of the slide bar to the first end portion of the slide bar, and may be referred to as the direction indicated by the first end portion.

Details of the operation S301 may refer to the operation of S101 and will not be repeatedly described herein.

In an operation S302, the number of sliding operations included in the sliding operation may be obtained.

The number of sliding operations may be interpreted as the number of times that the slide block located at the first end portion of the slide bar or the slide block that has reached the first end portion of the slide bar further slides along the direction indicated by the same end portion.

For example, when the slide block is located at the left end portion of the slide bar, the number of sliding operations may be the number of times that the slide block is controlled by the user to continuously slide along the left end portion; when the slide block is located at the right end portion of the slide bar, the number of sliding operations may be the number of times that the slide block is controlled by the user to continuously slide along the right end portion.

In an operation S303, a information setting control corresponding to the number of sliding operations may be determined from a setting control set, and the setting control set may be at least one information setting control, which has the function associated with the system function corresponding to the slide bar.

It can be understood that various numbers of sliding operations may correspond to various information setting controls, but all of the information setting controls may have functions associated with a same system function.

In an example, the slide bar is brightness adjustment slide bar. The slide block at a left boundary of the slide bar and controlled to slide once may correspond to the dark mode control. The slide block at the left boundary of the slide bar and controlled to slide twice may correspond to the grayscale mode control. The slide block at the left boundary of the slide bar and controlled to slide three times may correspond to a non-transparent mode control. The slide block at a right boundary of the slide bar and controlled to slide once may correspond to the bright color mode control. The slide block at the right boundary of the slide bar and controlled to slide twice may correspond to the color mode control. The slide block at the right boundary of the slide bar and controlled to slide three times may correspond to the transparent mode control.

In another example, the slide bar may be the volume adjustment slide bar. The slide block at a left boundary of the slide bar and controlled to slide once may correspond to a vibration mode control for incoming calls. The slide block at the left boundary of the slide bar and controlled to slide twice may correspond to the DND mode control. The slide block at the left boundary of the slide bar and controlled to slide three times may correspond to the non-transparent mode control. The slide block at a right boundary of the slide bar and controlled to slide once may correspond to the ringtone mode control. The slide block at the right boundary of the slide bar and controlled to slide twice may correspond to the color mode control. The slide block at the right boundary of the slide bar and controlled to slide three times may correspond to a message reminding mode control.

Therefore, various end portions of various slide bars may correspond to various setting control sets. Each setting control set may correspond to a certain number of sliding operations. A current information setting control set may be determined based on the system function corresponds to the slide bar, the end portion where the slide block is located, and a sliding direction of the slide block at the end portion. Further, the information setting control corresponding to the current number of sliding operations may be determined based on a corresponding relationship between each information setting control and the number of sliding operations.

In an operation S304, in response to the sliding operation, the information setting control may be displayed at the first position.

The type of the information setting control may be preset. When the user controls the slide block to slide out of the boundary of the slide bar, the preset information setting control may be displayed.

Of course, the first position of information setting control may be preset, such as at a position adjacent to the end portion of the slide bar. In some embodiments, the first position may locate out of the slide bar and on an extension of the slide bar. In addition, the position may be 50 mm away from the first end portion of the slide bar.

In some embodiments, when the first end portion is the left end portion or the upper end portion, a first information setting control, which has the function associated with the system function of the slide bar, may be displayed at a first preset position. When the first end portion is the left end portion or the upper end portion, a second information setting control, which has the function associated with the system function of the slide bar, may be displayed at a second preset position.

The first information setting control and the second information setting control may be two opposite modes corresponding to a same function. For example, the first information setting control may be an adjustment control in the dark mode whereas the second information setting control may be an adjustment control in the light mode. Correspondingly, the first preset position and the second preset position may be positions corresponding to two end portions of the slide bar. For example, the first preset position may locate out of the slide bar and on an extension of the slide bar. In addition, the first position may be 50 mm away from the left end portion of the slide bar, and the second preset position may locate out of the slide bar and on an extension of the slide bar. In addition, the second position may be 50 mm away from the right end portion of the slide bar.

In the embodiments of the present disclosure, the sliding operation on the slide block in the slide bar may be received, the sliding operation may control the slide block to continue to slide along the direction indicated by the first end portion after the slide block reaches the first end portion of the slide bar. The number of sliding operations included in the sliding operation may be determined, such that the information setting control corresponding to the number of sliding operations may be determined from the setting control set, and the information setting control may be displayed at the first position. When the user controls the slide block to continue to slide along the end portion of slide bar, the extended control may be displayed at the position corresponding to the end portion. In this way, functions of the slide bar may be expanded, and application scenarios of the slide bar may be increased. In addition, opposite function modes may be respectively configured at the left and the right end portions of the slide bar, enabling the user to move the slide block to the left and to the right to perform operations on the pop-up extended control to set functions.

Embodiments of the present disclosure further provide an apparatus, configured to perform the method in the embodiments of the present disclosure. Details that are not disclosed in the apparatus in the embodiments of the present disclosure may be referred to the method in the embodiments of the present disclosure.

Figure 9:
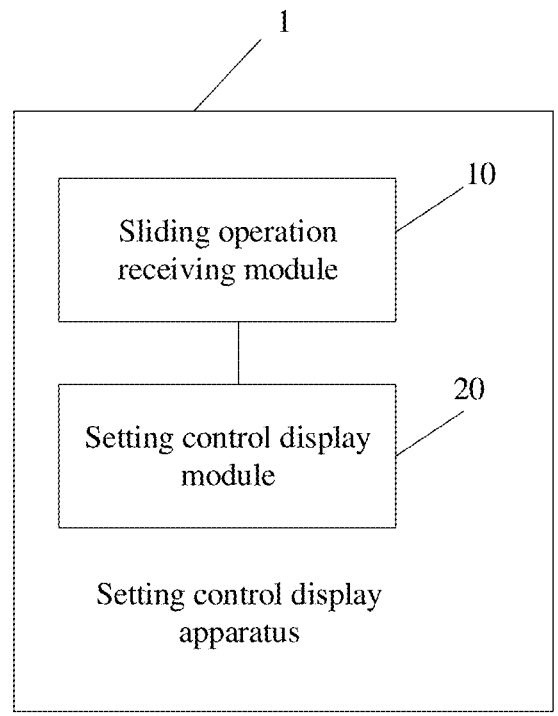
FIG. 9 is a structural schematic view of an apparatus of displaying a setting control according to an embodiment of the present disclosure.

As shown in FIG. 9, FIG. 9 is a structural schematic view of an apparatus of displaying a setting control according to an embodiment of the present disclosure. All or a part of a setting control display apparatus may be achieved by a software, a hardware or a combination thereof. An apparatus 1 may include a sliding operation receiving module 10 and a setting control display module 20.

The sliding operation receiving module 10 may be configured to receive a sliding operation on a slide block in a slide bar. The sliding operation may control the slide block to continue sliding along a first direction after the slide block reaches a first end portion of the slide bar. The first direction is the direction from the non-end portion of the slide bar to the first end portion of the slide bar, and may be referred to as the direction indicated by the first end portion.

The setting control display module 20 may be configured to display an information setting control, which has the function associated with a system function of the slide bar, at a first position in response to the sliding operation.

In some embodiments, the setting control display module 20 may be specifically configured to perform following operations.

The setting control display module 20 may be configured to display the information setting control, which has the function associated with the system function of the slide bar, at the first position, and adjust the information setting control to allow the information setting control to be displayed in a highlighted state.

Figure 10:
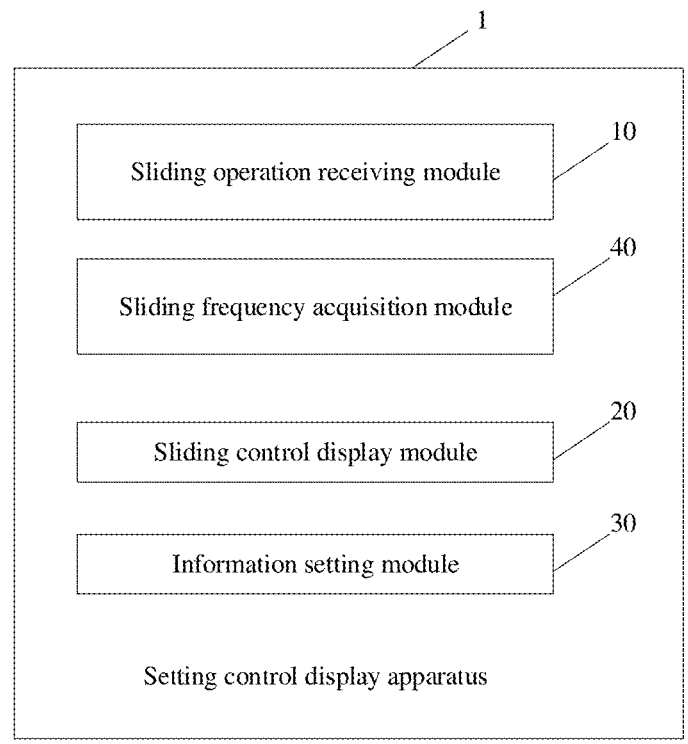
FIG. 10 is a structural schematic view of another apparatus of displaying a setting control according to an embodiment of the present disclosure.

In some embodiments, as shown in FIG. 10, the apparatus may further include following components.

An information setting module 30 may be included and configured to receive a selection instruction for the information setting control to set the system function as the information indicated by the information setting control, and adjust the information setting control to be displayed in a grayscale state.

Figure 11:
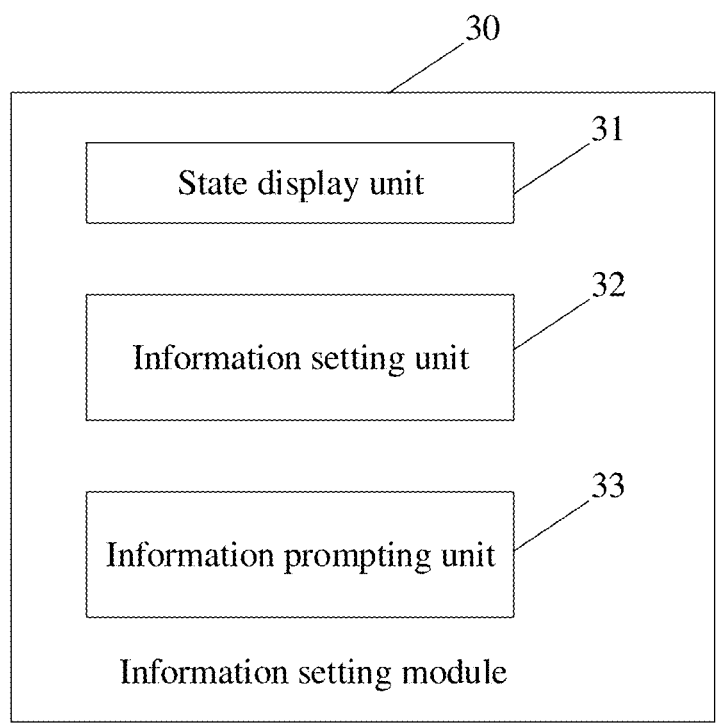
FIG. 11 is a structural schematic view of an information setting module according to an embodiment of the present disclosure.

In some embodiments, as shown in FIG. 11, the information setting module 30 may further include following components.

A state display unit 31 may be included and configured to display a setting switching state on the display interface.

An information setting unit 32 may be included and configured to turn off the setting switching state when setting is successful, and to set the system function as the information indicated by the information setting control.

In some embodiments, as shown in FIG. 11, the information setting module 30 may further include following components.

An information prompting unit 33 may be included and configured to output failure prompt information that includes a failure reason, in response to setting failure.

In some embodiments as shown in FIG. 10, the apparatus may further include following components.

A sliding frequency acquisition module 40 may be included and configured to obtain the number of sliding operations included in the sliding operation.

The setting control display module 20 may be specifically configured to perform following operations.

The setting control display module 20 may be configured to determine the information setting control corresponding to the number of sliding operations from a setting control set. The setting control set may be at least one information setting control, which has the function associated with the system function corresponding to the slide bar.

The setting control display module 20 may be configured to display the information setting control at the first position.

In some embodiments, the setting control display module 20 may specifically be configured to perform following operations.

The setting control display module 20 may be configured to display a first information setting control, which has the function associated with the system function corresponding to the slide bar, at a first preset position in response to the first end portion being a left end portion or an upper end portion.

The setting control display module 20 may be configured to display a second information setting control, which has the function associated with the system function corresponding to the slide bar, at a second preset position in response to the first end portion being a left end portion or an upper end portion.

It should be noted that, when the setting control display apparatus provided by the above embodiment executes the method of displaying the setting control, it may be illustrated by giving examples for the division of the above functional modules only. In practical applications, the above function may be completed by different function modules according to requirements, it means that the internal structure of the apparatus may be divided into different functional modules to complete all or part of the functions described above. In addition, the setting control display apparatus and the method of embodiments of setting control display provided by the above embodiments belong to the same concept, and the implementation process in detail is shown in the method of embodiments and will not be repeatedly described herein.

The above serial numbers of the embodiments of the present disclosures are only for description, and do not represent advantages or disadvantages of the embodiments.

In the embodiments of the present disclosure, the sliding operation on the slide block in the slide bar may be received, the sliding operation may control the slide block to continue to slide along the direction indicated by the first end portion after the slide block reaches the first end portion of the slide bar. The information setting control, which has the function associated with the system function of the slide bar, may be displayed at the first position. The extended control may be displayed at the first position when the user controls the slide block to continue to slide along the end portion, In this way, functions of the slide bar may be expanded, and application scenarios of the slide bar may be increased. Furthermore, the user may perform operations on the extended control for setting functions. Usually, the slide bar may be configured on the quick setting interface. The user may set extended functions by simply performing operations on the slide bar on the quick setting interface, without entering setting options of the system to find out the function to be set. In this way, the setting process may be simplified, and time consumed for setting may be shortened. In addition, in the process that the user clicks the extended control for setting, the setting switching state may be displayed and the prompt information may be displayed when the setting fails, the display effect may be intuitive and convenient, and the user experience may be improved. Moreover, the extended control may be set to be displayed in the highlighted mode and in the grayscale mode when the extended control is in different states, and the display effect may be intuitive and conform to the user's usage habits.

The embodiments of the present disclosure further provide a non-transitory computer storage medium. The non-transitory computer storage medium may store a plurality of instructions, and the processor may be configured to load instructions and perform the method of determining an indicated direction as shown in the embodiments shown in FIG. 1-FIG. 8. Detailed execution processes of the embodiments may be described in FIG. 1-FIG. 8 by reference to the specific description of the embodiments, and will not be repeatedly described herein.

The present disclosure provides a computer program product, the computer program product may store more than one instruction, and the processor is configured to load more than one instructions and perform the method of enabling multi-frequency hotspots in the embodiments shown in FIG. 1-FIG. 8. The specific execution process of the embodiments may be described in FIG. 1-FIG. 8 by reference to the specific description of the embodiments, and will not be repeatedly described herein.

Figure 12:
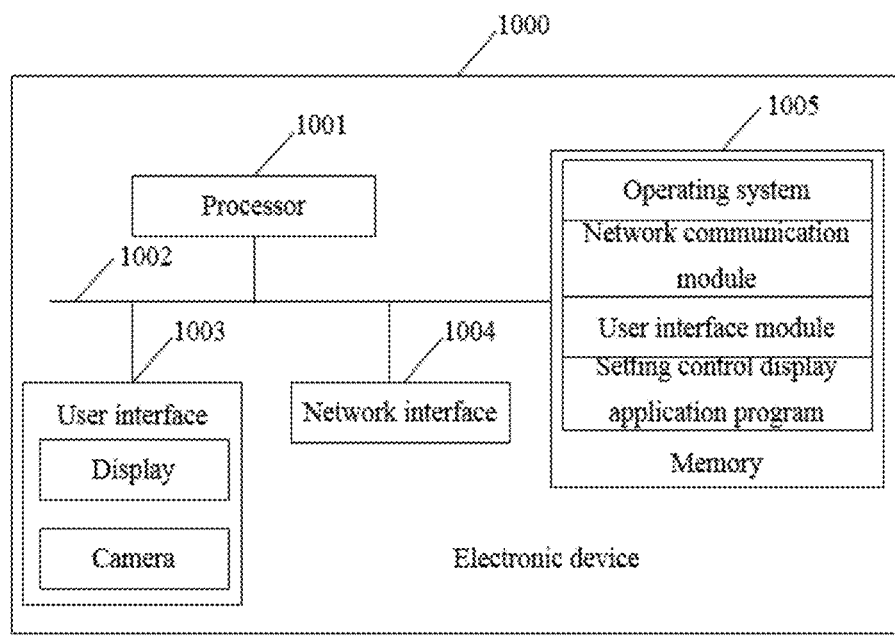
FIG. 12 is a structural schematic view of an electronic device according to an embodiment of the present disclosure.

As shown in FIG. 12, FIG. 12 is a structural schematic view of an electronic device according to an embodiment of the present disclosure. As shown in FIG. 12, an electronic device 1000 may include: at least one processor 1001, at least one network interface 1004, a user interface 1003, a memory 1005, and at least one communication bus 1002.

The communication bus 1002 may be configured to achieve communicative connection between these components.

The user interface 1003 may include a display and a camera. The user interface 1003 may further include a standard wired interface and a wireless interface.

The network interface 1004 may include a standard wired interface and a wireless interface (such as a WI-FI interface).

The processor 1001 may include one or more processing cores. The processor 1001 uses the various interfaces and lines to connect the various parts of the entire electronic device 1000, and executes various functions and data processing of electronic device 1000 by running or executing an instruction, a program, a code set, an instruction set, or calling data stored in the memory 1005. The processor 1001 may be accomplished at least one hardware form of a digital signal processing (DSP), a field-programmable gate array (FPGA), or a programmable logic array (PLA). The processor 1001 may integrate one or a combination of a central processing unit (CPU), a graphics processing unit (GPU), a modem, and the like. The CPU is mainly configured to operate a system, a user interface, and an application program; the GPU is configured to render and draw content displayed on the display screen; the modem is configured to operate the wireless communication. It can be understood that, the modem may be implemented by a single chip without integrating into the processor 1001.

The memory 1005 may include a random access memory (RAM), or a read-only memory (ROM). The memory 1005 includes a non-transitory computer-readable storage medium. The memory 1005 may be configured to store an instruction, a program, a code, a code set, or an instruction set. The memory 1005 may include a program storage area and a date storage area, and the program storage area may store instructions used for implementing an operating system, instructions for at least one function (such as a touch function, a sound playback function, an image playback function, and the like), instructions for implementing the above method of embodiments, and the like; the date storage area may store the data and the like involved in the above method of embodiments. The memory 1005 may also be at least one storage device located away from the aforementioned processor 1001. As shown in FIG. 12, as a non-transitory computer storage medium, the memory 1005 may include an operating system, a network communication module, a user interface module, and a setting control display application program.

In the electronic device 1000 shown in FIG. 12, the user interface may be mainly configured to provide an input interface for users to obtain the date input by users; and the processor 1001 may be configured to invoke a setting control stored in the memory 1005 to display the application program, and performs the following operations.

A sliding operation on a slide block in a slide bar may be received. The sliding operation may be configured to control the slide block to continue sliding along a first direction after the slide block reaches a first end portion of the slide bar. The first direction is the direction from the non-end portion of the slide bar to the first end portion of the slide bar, and may be referred to as the direction indicated by the first end portion.

An information setting control, which has the function associated with a system function of the slide bar, may be displayed at the first position in response to the sliding operation.

In an embodiment, when the processor 1001 displays an information setting control, which has the function associated with a system function of the slide bar, at the first position, following operations may be performed.

The information setting control, which has the function associated with the system function of the slide bar, may be displayed at the first position, and the information setting control may be adjusted to be displayed in a highlighted state.

In an embodiment, after the processor 1001 adjusts the information setting control to allow the information setting control to be displayed in a highlighted state, following operations may further be performed.

A selection instruction for the information setting control may be received. The system function may be set as information indicated by the information setting control, and the information setting control may be adjusted to be displayed in a grayscale state.

In an embodiment, when the processor 1001 sets the system function as information indicated by the information setting control, following operations may further be performed A setting switching state may be displayed on a display interface.

The setting switching state may be turned off when setting is successful, and the system function may be set as the information indicated by the information setting control.

In an embodiment, the processor 1001 may further perform following operations.

Failure prompt information that includes a failure reason may be output in response to setting failure.

In an embodiment, the processor 1001 may further perform following operations.

The number of sliding operations included in the sliding operation may be obtained.

The processor 1001 displaying an information setting control, which has the function associated with a system function of the slide bar, at the first position, may include following operations.

An information setting control corresponding to the number of sliding operations may be determined from a setting control set, wherein the setting control set is at least one information setting control, which has the function associated with the system function of the slide bar.

The information setting control may be displayed at the first position.

In an embodiment, when the processor 1001 displays an information setting control, which has the function associated with a system function of the slide bar, out of the boundary of the first position, following operations may be performed.

A first information setting control, which has the function associated with the system function of the slide bar, may be displayed at a first preset position in response to the first end portion being a left end portion or an upper end portion;

A second information setting control, which has the function associated with the system function of the slide bar, may be displayed at a second preset position in response to the first end portion being a left end portion or an upper end portion.

In the embodiments of the present disclosure, the sliding operation on the slide block in the slide bar may be received, the sliding operation may control the slide block to continue to slide along the direction indicated by the first end portion after the slide block reaches the first end portion of the slide bar. The information setting control, which has the function associated with the system function of the slide bar, may be displayed at the first position. The extended control may be displayed at the first position when the user controls the slide block to continue to slide along the end portion. In this way, functions of the slide bar may be expanded, and application scenarios of the slide bar may be increased. Furthermore, the user may perform operations on the extended control for setting functions. Usually, the slide bar may be configured on the quick setting interface. The user may set extended functions by simply performing operations on the slide bar on the quick setting interface, without entering setting options of the system to find out the function to be set. In this way, the setting process may be simplified, and time consumed for setting may be shortened. In addition, in the process that the user clicks the extended control for setting, the setting switching state may be displayed and the prompt information may be displayed when the setting fails, the display effect may be intuitive and convenient, and the user experience may be improved. Moreover, the extended control may be set to be displayed in the highlighted mode and in the grayscale mode when the extended control is in different states, and the display effect may be intuitive and conform to the user's usage habits.

Those of ordinary skill in the art may understand that all or part of the processes of the above method of embodiments may be implemented by instructing relevant hardware through a computer program. The programs may be stored in a computer-readable storage medium. The processes of the above methods of embodiments may be included when the programs are executing. The non-transitory storage medium may be a magnetic disk, an optical disk, a read-only storage memory or a random access memory, and the like.

The embodiments disclosed above are exemplary only and shall not be interpreted as limiting the scope of the embodiments of the present disclosure. Therefore, equivalent changes according to the claims of the present disclosure shall be within the scope of the present disclosure.

What is claimed is:

1. A method of displaying a setting control, comprising:
receiving a sliding operation on a slide block in a slide bar on a user interface, wherein the sliding operation is configured to control the slide block to continue sliding along a first direction after the slide block reaches a first end portion of the slide bar, and the first direction is a direction from a non-end portion of the slide bar to the first end portion;
obtaining a number of sliding operations comprised in the sliding operation;
determining an information setting control corresponding to the number of sliding operations from a setting control set, wherein the setting control set is comprises two or more information setting controls and corresponds to the first end portion of the slide bar, different numbers of sliding operation correspond to different information setting controls in the setting control set, and functions of all of the different information setting controls are associated with a same function of the slide bar; and
displaying the information setting control at a first position on the user interface in response to the sliding operation.

2. The method according to claim 1, wherein the displaying the information setting control at the first position in response to the sliding operation, comprises:
displaying the information setting control, which has the function associated with the function of the slide bar, at the first position, and adjusting the information setting control to allow the information setting control to be displayed in a highlighted state.

3. The method according to claim 2, further comprising:
after the adjusting the information setting control to allow the information setting control to be displayed in a highlighted state,
receiving a selection instruction for the information setting control, setting the function as information indicated by the information setting control, and adjusting the information setting control to allow the information setting control to be displayed in a grayscale state.

4. The method according to claim 3, wherein the setting the function as information indicated by the information setting control, comprises:
displaying a setting switching state on a display interface; and
turning off the setting switching state when setting is successful, and setting the function as the information indicated by the information setting control.

5. The method according to claim 4, wherein the method further comprises:
outputting failure prompt information that comprises a failure reason, in response to setting failure.

6. The method according to claim 1, wherein the first end portion is an end portion corresponding to a maximum value in the slide bar or an end portion corresponding to a minimum value in the slide bar.

7. The method according to claim 6, wherein the displaying the information setting control at the first position in response to the sliding operation, comprises at least one of:
displaying a first information setting control, which has a first function associated with the function of the slide bar, at a first sub-position in response to the first end portion being the end portion corresponding to the maximum value in the slide bar; or
displaying a second information setting control, which has a second function associated with the function of the slide bar, at a second sub-position in response to the first end portion being the end portion corresponding to the minimum value in the slide bar.

8. The method according to claim 1, further comprising:
displaying a corresponding icon or texts on the information setting control.

9. The method according to claim 2, further comprising:
adjusting the information setting control to allow the information setting control to be displayed in a grayscale state or hidden, and moving the slide block into the slide bar to allow the slide block to be displayed in the highlighted state, in response to the information setting control being touched to slide in a direction opposite to the direction from a non-end portion of the slide bar to the first end portion of the slide bar.

10. An electronic device, comprising a processor and a non-transitory memory; wherein the non-transitory memory stores computer programs, and the processor is configured to load the computer programs to perform:
receiving a sliding operation on a slide block in a slide bar on a user interface, wherein the sliding operation is configured to control the slide block to continue sliding along a first direction after the slide block reaches a first end portion of the slide bar, and the first direction is a direction from a non-end portion of the slide bar to the first end portion;
obtaining a number of sliding operations comprised in the sliding operation;
determining an information setting control corresponding to the number of sliding operations from a setting control set, wherein the setting control set is comprises two or more information setting controls and corresponds to the first end portion of the slide bar, different numbers of sliding operation correspond to different information setting controls in the setting control set, and functions of all of the different information setting controls are associated with a same function of the slide bar; and
displaying the information setting control at a first position on the user interface in response to the sliding operation.

11. The electronic device according to claim 10, wherein while displaying the information setting control at the first position in response to the sliding operation, the processor is further configured to load the computer programs to perform:
displaying the information setting control, which has the function associated with the function of the slide bar, at the first position, and adjusting the information setting control to allow the information setting control to be displayed in a highlighted state.

12. The electronic device according to claim 11, wherein the processor is further configured to load the computer programs to perform: after adjusting the information setting control to allow the information setting control to be displayed in the highlighted state, receiving a selection instruction for the information setting control; setting the function as information indicated by the information setting control; and adjusting the information setting control to allow the information setting control to be displayed in a grayscale state.

13. The electronic device according to claim 12, wherein while setting the function as information indicated by the information setting control, the processor is further configured to load the computer programs to perform:
displaying a setting switching state on a display interface; and
turning off the setting switching state when setting is successful, and setting the function as the information indicated by the information setting control.

14. The electronic device according to claim 13, wherein the processor is further configured to load the computer programs to perform:
outputting failure prompt information that comprises a failure reason, in response to setting failure.

15. The electronic device according to claim 10, wherein the first end portion is an end portion corresponding to a maximum value in the slide bar or an end portion corresponding to a minimum value in the slide bar.

16. The electronic device according to claim 15, wherein while displaying the information setting control at the first position in response to the sliding operation, the processor is further configured to load the computer programs to perform at least one of:
displaying a first information setting control, which has a first function associated with the function of the slide bar, at a first sub-position in response to the first end portion being the end portion corresponding to the maximum value in the slide bar; or
displaying a second information setting control, which has a second function associated with the function of the slide bar, at a second sub-position in response to the first end portion being the end portion corresponding to the minimum value in the slide bar.

17. The electronic device according to claim 11, wherein the processor is further configured to load the computer programs to perform:
adjusting the information setting control to allow the information setting control to be displayed in a grayscale state or hidden, and moving the slide block into the slide bar to allow the slide block to displayed in the highlighted state, in response to the information setting control being touched to slide a direction opposite to the direction from a non-end portion of the slide bar to the first end portion of the slide bar.

18. A computer-readable non-transitory storage medium, wherein the computer-readable non-transitory storage medium stores a plurality of instructions, and the plurality of instructions are configured to be loaded by a processor to perform operations of:
receiving a sliding operation on a slide block in a slide bar on a user interface, wherein the sliding operation is configured to control the slide block to continue sliding along a first direction after the slide block reaches a first end portion of the slide bar, and the first direction is a direction indicated by the first end portion from a non-end portion of the slide bar to the first end portion;
obtaining a number of sliding operations comprised in the sliding operation;
determining an information setting control corresponding to the number of sliding operations from a setting control set, wherein the setting control set is comprises two or more information setting controls and corresponds to the first end portion of the slide bar, different numbers of sliding operation correspond to different information setting controls in the setting control set, and functions of all of the different information setting controls are associated with a same function of the slide bar; and
displaying the information setting control at a first position on the user interface associated with a system function corresponding to the slide bar at a preset position in response to the sliding operation.

* * * * *